Dec. 14, 1965    J. G. E. COHN ETAL    3,223,556
FUEL CELL
Filed April 13, 1961    8 Sheets-Sheet 1
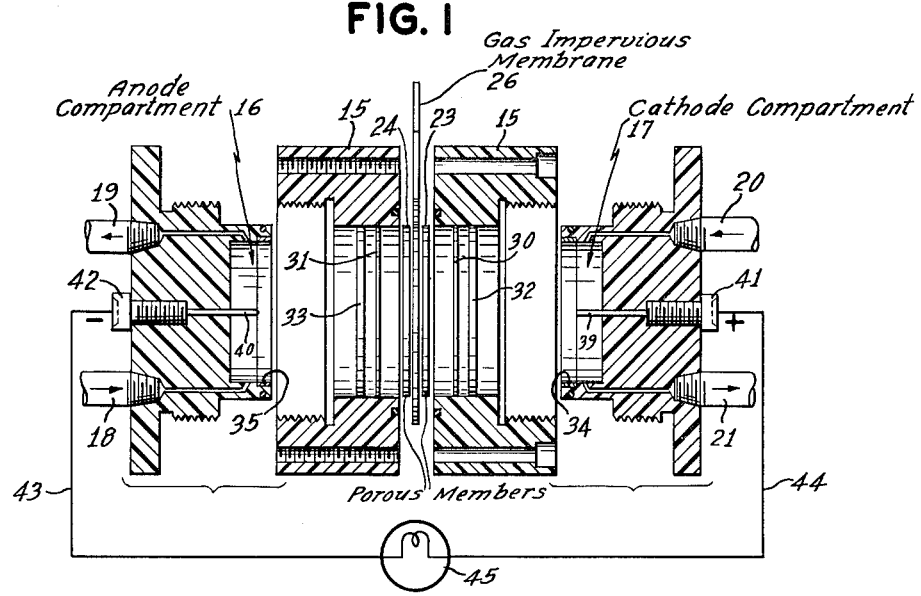
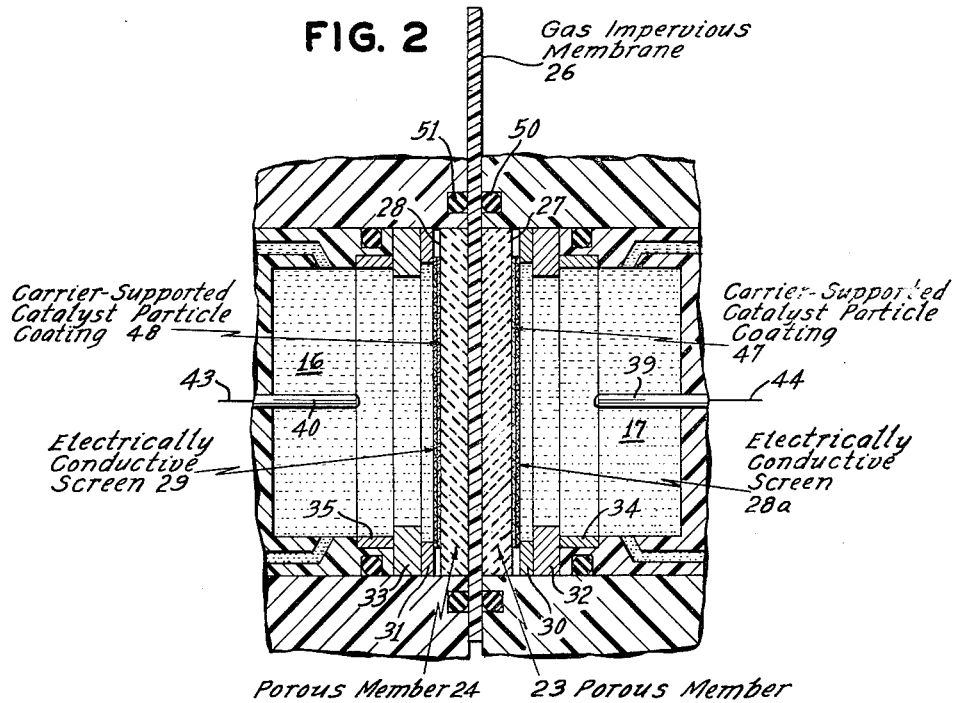
INVENTORS
JOHANN G. E. COHN
ANNA P. HAUEL
CARL D. KEITH
BY
Roger J. Drew
ATTORNEY

INVENTORS
JOHANN G.E. COHN
ANNA P. HAUEL
CARL D. KEITH 3,223,556
FUEL CELL
Johann G. E. Cohn and Anna P. Hauel, West Orange, and Carl D. Keith, Summit, N.J., assignors to Engelhard Industries, Inc., Newark, N.J., a corporation of Delaware
Filed Apr. 13, 1961, Ser. No. 103,687
6 Claims. (Cl. 136—86)

This invention relates to electricity-producing apparatus and more particularly to fuel cells and catalytic electrodes adapted for use therein.

Permeable carbon electrodes for fuel cells, such as blocks, plates, tubes or thimbles are known in the prior art. However, these electrodes are disadvantageous because difficult to prepare and requiring wet-proofing, for instance by treatment with wax solution to coat the pore walls on evaporation of the solvent. The wet-proofing prevents the electrolyte from penetrating far into the electrode and "drowning" the electrode, and thus passage through the electrode for the gaseous fuel and oxygen is kept open. However, differences in wet-proofing rather than differences in intrinsic catalytic activity may determine differences in catalyst performance. In addition, the preparation of such porous carbon electrodes is a tedious process and lacks the convenient reproducibility which we have found is attained in preparing the catalytic electrodes of the present invention. Further, the wet-proofing also is disadvantageous because it may interfere with exposure of active metal surface by the electrode, especially if the temperature is elevated.

Nickel electrodes are known which are porous to gaseous fuel but not to electrolytes. However, such nickel electrodes are attacked by acids and therefore are not suitable for use in fuel cells where acid electrolytes are used.

One primary interest of this invention is in applying the discoveries made by the superior methods of test catalysts preparation disclosed in the examples to commercially practical fuel cells. Modification of the test cells for such purposes, and where required, their scaling up to large size units, is possible by applying known methods to the discoveries of this invention. Toward selection of preferred oxygen electrode structures in combination with specific electrolytes for commercial application, discoveries of this invention are invaluable.

Also of interest in the present invention is the preparation of readily evaluated test cells. These, as has been noted, lead directly to improved commercial fuel cells.

It is a distinct advantage for testing general fuel cell conditions and rapid evaluation of variations in the catalysts and their polarization characteristics to prepare catalytic electrodes as described hereinafter. The invention is also useful in providing novel and superior catalyst combinations, which can be applied to powdered supports, for instance powdered carbon supports.

It is an outstanding advantage of electrode structures of this invention that a more ready evaluation of the possibility of operation with acid electrolytes utilizing various catalytically active metals is possible. Acid solvation effects, which are obviously detrimental to the maintenance of the catalyst surface, can more readily be determined with catalyst powders than in the case where the active metal is deposited on a carbon block.

Successful operation of fuel cells with strong alkalis such as KOH as electrolyte has been demonstrated for the $H_2$–$O_2$ reaction and for certain organic fuels. However, organic liquids or gases as fuels are cheaper and more readily available than hydrogen. It is of great interest to show complete oxidation of an organic material as fuel in the fuel cell. Such complete oxidation would form $CO_2$, which would then react with the alkaline electrolyte changing the electrolyte's character and performance, and hence alkaline electrolytes are not satisfactory when organic fuels are used.

However, in acid or neutral solutions, i.e. solutions containing no free base, $CO_2$ would generally be driven out of the solution as a gas so that products of the reaction, aside from water, would not collect in the electrolyte. The effect of such dilution with water could be conveniently compensated for as needed by removing a small portion of electrolyte and replacing it with concentrated electrolyte. By contrast, as regards alkaline electrolytes with alkaline carbonates formed, it might be necessary to replace the electrolyte completely for satisfactory performance.

For the operation of the acid cell, it is also important that the oxygen electrode have maximum activity. In the past, oxygen electrode performance in acid electrolyte has been inferior compared with operation in alkaline electrolyte. However, in accordance with the present invention, we have developed conditions for improved cathodic systems and considerably improved oxygen electrode performance in acid electrolytes.

The electrochemical apparatus of the present invention, in its broader aspects, comprises porous material coated with powdered carrier-supported precious-metal-containing catalyst particles on opposite sides of such porous material, electrolyte at least partially wetting such porous material and catalyst particles, a fuel contacting the catalyst particles on one side of the porous material, an oxidizer contacting the catalyst particles on the other side of the porous material, separate electrically conductive means contacting respectively the catalyst particles exposed to fuel and oxidizer, and means for holding the apparatus together. The electrically conductive means may or may not serve also as the means to hold the apparatus together depending on its structure and the design of the apparatus.

An operable fuel cell is possible as above described if the porous material is in the form of a horizontal layer, with liquid fuel dripping onto the catalyst particles on the upper surface of the porous layer, and air contacting the catalyst on the lower surface of the porous layer. A non-volatile electrolyte, preferably an acid, is necessary to maintain its concentration in contact with the air, and some method of holding the structure together is needed. Such an elementary fuel cell operates favorably with the specified catalysts of this invention.

In practice it is generally preferred to enclose the structure wet with the electrolyte in a container, with separate anode and cathode compartments contacting respectively the surfaces of the porous material coated by the anode and cathode catalyst layers. With this assembly, at the rates required, the fuel is fed into the anode compartment and the oxidizer into the cathode compartment. The porous material with its catalyst coatings is held in position by structures which contact each of said catalyst layers, and may also serve as the required electrically conductive means contacting the respective anode and cathode catalyst layers.

The porous material can be in sheet or plate-like form. It is preferably a material of low electrical conductivity such as ceramic including fibrous ceramics and glass fabrics, cellulose including wood sheets and formed pulp sheets, and animal skins including chamois leather. Among the fibrous ceramics, the refractory ceramic fabrics are preferred and among these refractory ceramic fabrics, aluminum silicate fabrics and silica fabrics are preferred. Chamois leather is preferred among the animal skins, and chemical wood pulp for instance of the bisulfite process is preferred among the wood pulp sheets, although non-chemical wood pulp sheets for instance ground wood sheets can also be used.

The porous material may consist of a single sheet or piece of the material, in which case the anode and cathode catalysts would be coated on opposite sides of the material. It may also consist of a plurality of pieces in layers with the anode and cathode catalysts positioned on the anode and cathode sides of the assembly. Use of multiple porous pieces is especially favorable in structures with positioning of the porous material and catalysts between anode and cathode compartments of a closed container, as the porous sheets and the catalyst coatings may be pressed together to assure good electrolyte wetting of all the porous material and catalysts and good electric contacting to such as wires delivering current produced by the cell at both the anodic and the cathodic catalysts. Additional electrolyte space may be provided in such closed containers if desired; however, such provision has no important advantage.

Such fuel cells are operable although, with gaseous fuels and/or oxidizers, some gas may pass completely through the electrolyte to the opposite chamber and then react only in part on the catalyst surface there. With gas passing through the electrolyte efficiency of the fuel cell is decreased. An embodiment of choice of this invention contains, intermediate between the layers of porous material containing the deposited catalyst, a gas-impervious membrane moistened with electrolyte. A particular arrangement of this sort comprises successively anodic catalyst on the anode chamber side of a sheet of porous material, the gas-impervious membrane, and a second sheet of porous material with cathodic catalyst on the cathode chamber side of it.

The electrically conductive member or means providing electrical contact with the catalyst coating on the porous material is preferably so disposed in the cell compartment as to cover and contact substantially all of this catalyst coating. Good results were obtained with this electrically conductive member in the form of a screen woven of a small diameter platinum-rhodium wire containing a predominant amount of platinum. Other good results with superior reproducibility were obtained when the electrically conductive member in contact with each catalyst was a non-porous carbon block with a few holes through it permitting free access of gaseous fuel or oxidized to the catalyst.

The platinum group metal of the catalyst is preferably supported on powdered activated carbon, the powdered activated-carbon-supported catalyst being in turn deposited or supported on the porous material. The method of preparation of the catalytic electrode using the powdered activated carbon as carrier as contrasted with the block carbon-supported carrier of the prior art optimizes or makes the best use of the carbon with respect the activity of the catalyst. The carbon particles employed in the present invention are characterized by having surface area preferably from about 500–1500, more preferably from about 1000–1500 square meters per gram. These carbon particles have particles size of preferably 90 percent less than 90 microns, 70 percent less than 30 microns in size. Such carbon particles are of higher surface area and higher electrical resistance than the prior art one-piece catalytic carbon electrodes. By reason of having the catalytic metal supported on carbon particles of such small size and such high surface area, a higher catalytic activity per unit weight of catalyst is achieved, which is important in large fuel cell installations. The increase in electrical resistance of the carbon particles does not prevent an excellent transfer of the electrical charge produced on the catalyst surfaces to electrically conductive members in contact with the catalysts.

Since platinum group metals blacks have surface areas of about 25 square meters per gram, as contrasted to 1000 square meters per gram or so for activated carbon supported platinum group metals catalysts, it is known that the latter catalysts have a much greater surface of available metal. This is understood to explain the outstandingly higher activity of the supported catalysts on a contained metal basis.

Catalytic metals suitable for use in preparing the catalytic electrodes of the invention include precious metals including the platinum group metals, preferably platinum, palladium, rhodium, iridium, ruthenium or mixtures thereof. Among the mixtures of platinum group metals, a mixture of platinum, palladium and ruthenium in approximately equal proportions of each metal with the mixture supported on the carbon particles is preferred. Less preferably, platinum black, palladium black, or a platinum group metal such as one or more of the platinum group metals specified above can be deposited on the porous material previously described and so utilized. The catalytic metal is preferably utilized in the catalyst in amount of from about 2–40 weight percent (based on carrier weight).

The electrolyte used in the fuel cell of the present invention includes for instance various acid solutions, such as aqueous solutions of $H_2SO_4$ and $H_3PO_4$, preferably a 0.5–10 N $H_2SO_4$ solution. Further, solutions of a salt of a strong acid and strong base can be used as electrolyte, for instance $K_2SO_4$ or $MgSO_4$. Further, $K_2P_2O_7 \cdot 3H_2O$ or an acidic buffer solution can be utilized in the electrolyte, if desired.

The catalytic electrodes are prepared by depositing the powdered carrier-supported precious-metal-containing particles from a liquid onto the porous member as a uniform or substantially uniform coating thereon, and subsequently positioning an electrically conductive element in such fashion with respect the catalyst coating as to provide electrical contact therewith. The electrically conductive member, which can be of a metallic screen as previously discussed and preferably of a metal which is inert or corrosion resistant to acid, is so positioned or arranged with respect to porous member as to provide electrical contact with the catalyst layer. The deposition of the supported catalyst on the surface of the porous member is preferably carried out by first suspending the powdered carrier-supported precious-metal-containing catalyst in a liquid, for instance water, and depositing the supported catalyst particles from the liquid onto the surface of the porous member. Alternatively, the supported catalyst can be spread as a dry powder uniformly or substantially uniformly on the surface of the porous member, followed by wetting the powder on the member with a liquid, for instance water or electrolyte, and drawing the water or electrolyte through the porous member leaving the supported catalyst particles deposited thereon.

The invention will be more fully understood by reference to the following drawings wherein:

FIG. 1 is an elevational section through a fuel cell of the present invention which is partially disassembled;

FIG. 2 is an enlarged fragmentary sectional view of the fuel cell of FIG. 1 which is assembled;

Figure 3:
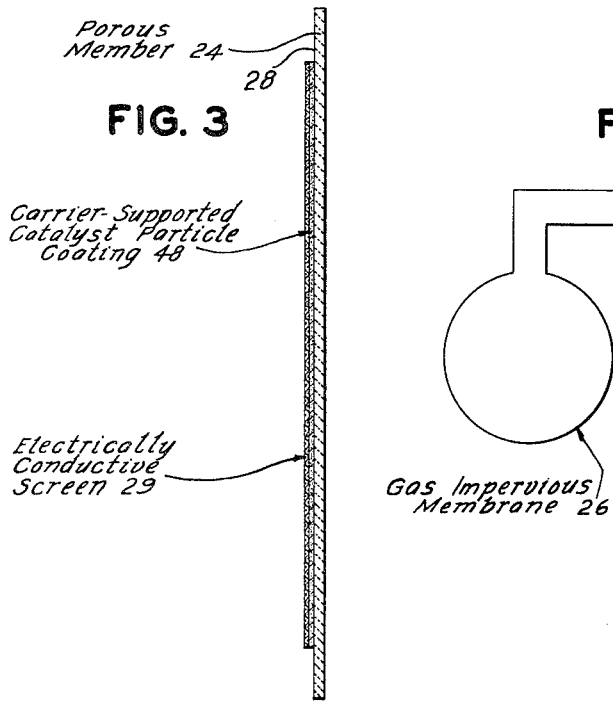
Figure 4:
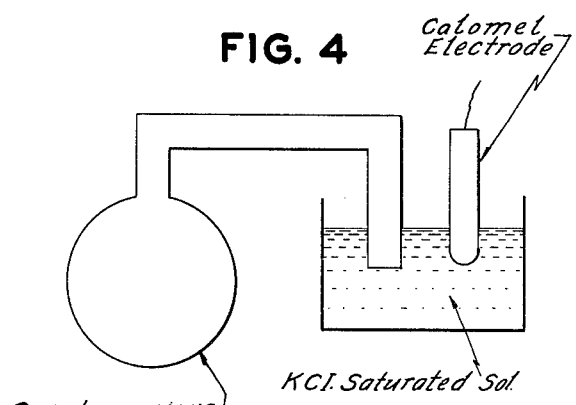
Figure 12:
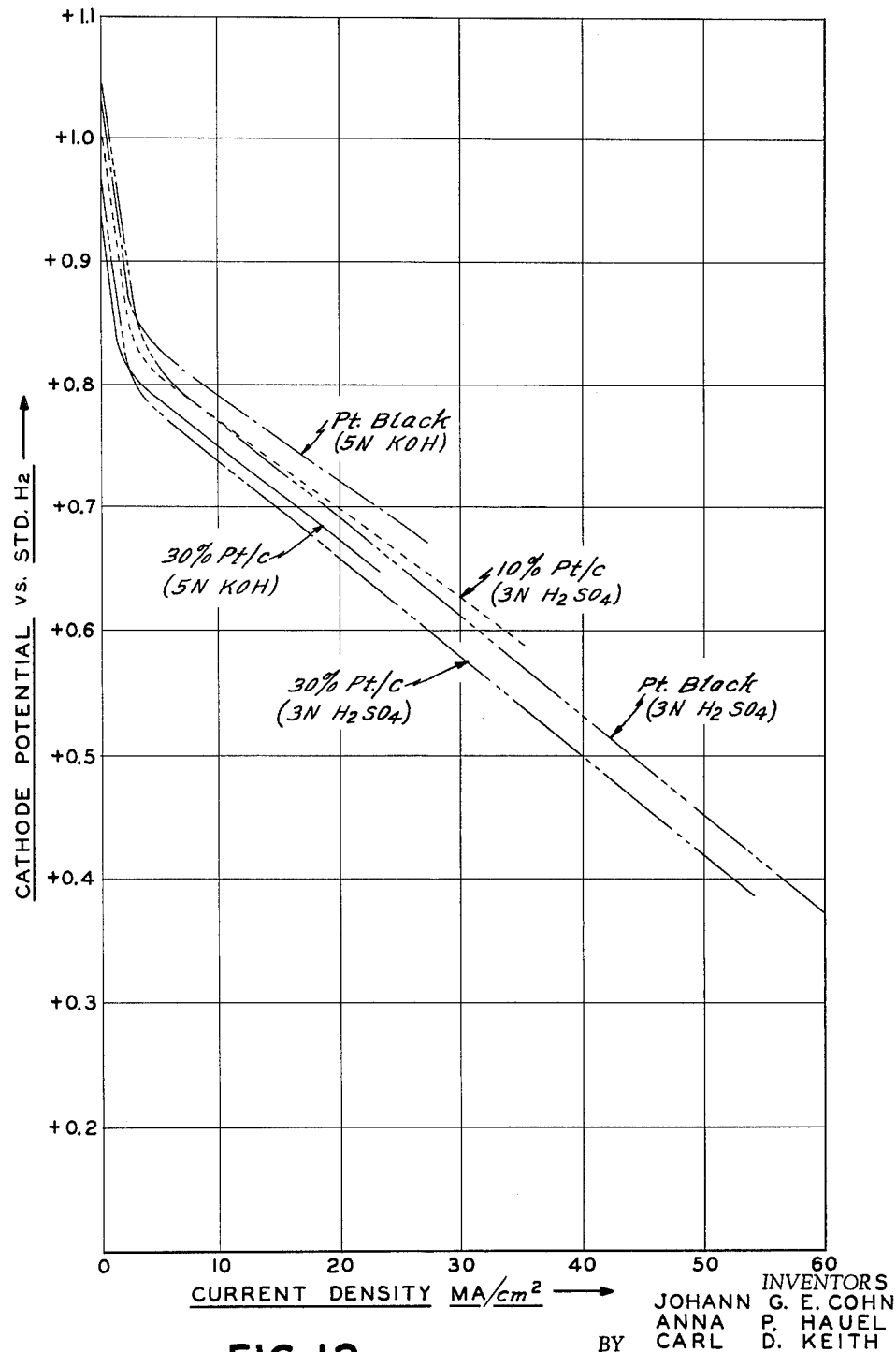

FIG. 3 is an enlarged cross section through a porous member of this invention as previously described having a substantially uniform coating of powdered carrier-supported precious-metal-containing catalyst particles thereon, and a conductive screen for good electrical contact with the catalyst placed against the catalyst, the porous member in this figure being a sheet of a fibrous refractory ceramic material;

FIG. 4 is an elevational section through a device for making measurements of cathode and anode potentials of the fuel cell of this invention;

FIGS. 5–11 are graphic representations showing plots of cathode potential or volts versus current density for various fuel cells;

FIG. 12 is a graphic representation showing plots of cathode potential versus current density for various fuel cells.

With reference to FIGS. 1 and 2, the fuel cell comprises a container or casing 15 having anode and cathode compartments 16 and 17 respectively. Container 15 is fabricated of a plastic of low electrical conductivity, for instance plastic "Lucite" or hard rubber. The inner surfaces of container 15 in contact with the electrolyte can be of a precious or noble metal when the electrolyte is an acid or neutral electrolyte, and of stainless steel when the electrolyte is an alkaline electrolyte. Fuel inlet and outlet 18 and 19 enable feeding of the fuel into the anode compartment and withdrawal of reaction product gases from the cell. It is possible to operate without a fuel outlet when a completely consumed fuel is used, but in general some flow of fuel over the catalyst surface and out of the chamber is preferred.

Fuels which can be utilized in the fuel cell of this invention include hydrogen; petroleum oils, hydrocarbons and oxygenated derivatives thereof including alcohols, for instance ethanol, methanol, etc., aldehydes; solid carbonaceous fuels, for instance coal slurried in a liquid such as water; natural gas, methane, ethane, propane, butane, and pentane to hexadecane.

The other reactant, for instance an oxidizing gas, is introduced into the cell through inlet 20 with reaction products withdrawn through discharge outlet 21. Oxidizing gases that can be used include air, oxygen-enriched air, or oxygen per se. When the oxilizer is completely consumed it is possible to operate the cell without use of the outlet of the oxidizer chamber; it is preferred to draw some oxygen over the catalyst and away through the outlet. Sheets of low electrical conductivity of one of the porous materials previously discussed are disposed or mounted in cathode and anode compartments 17 and 16 respectively.

As shown in FIG. 2, the surfaces 27 and 28 of porous sheets 23 and 24 respectively which are remote or farthest removed from central gas impervious membrane 26, have deposited thereon layers or coatings 47 and 48 of powdered carrier-supported precious metal-containing catalyst. This coating of the powdered catalyst particles on the surface of the non-electrically conductive sheet is shown in greater detail in FIG. 3. Gas impervious membrane 26 provides a gas tight separation between the anode and cathode compartments. Good results were obtained when gas impervious sheet 26 was a cation exchange membrane of the sulfonated polystyrene type reinforced with a Dynel fabric, Dynel fabric being a trademarked fabric available in commerce and a copolymer of vinyl chloride and acrylonitrile. Electrically conductive screens 28a and 29, shown in FIG. 2, are disposed over catalyst coatings 47 and 48 in contact with the substantial entirety of the outer surface of these catalyst coatings. The gas-impervious membrane, the porous sheets, and the deposited catalysts are all wetted with the electrolyte.

Gaskets 30 and 31, shown in FIG. 2, are of gold or other electrically conductive material and serve to retain or hold the electrically conductive screens 28a and 29 and the catalyst coatings 47 and 48 in contact with each other. Spacer rings of gold or other electrically conductive material are designated at 32 and 33. Additional rings of gold or other electrically conductive material are designated at 34 and 35. O rings 50 and 51 of gold at the upper and lower portions respectively of the cell, are imbedded in the plastic material of the cell container 15.

Electrically conductive elements 39 and 40 have terminals or contacts 41 and 42 respectively at their outer ends, wires 43 and 44 of an external circuit being connected to terminals 41 and 42 and incandescent lamp 45 being in the external circuit. The flow of current in the external circuit, due to the flow of electrons resulting from the electrochemical reaction within the fuel cell, results in incandescent lamp 45 being energized and lighting up.

FIGS. 1 and 2 show certain horizontal dimensions, e.g. thickness of the porous members, of greater size than according to scale to increase the clarity of the figures. In FIG. 3 the diameters of the porous member, the catalyst coating, and the electrically conductive screen are indicated in accordance with the following Example I. Approximate thicknesses of these materials are shown to scale in FIG. 3.

The examples further illustrating the invention are now given.

In the examples materials were used which are designated by their trade names. "Fiberfrax" is a refractory ceramic material (aluminum silicate). It was used in the form of a filter paperlike sheet which serves both as a backing for the catalysts in powder form on one surface and also as an absorbent which carried the electrolyte.

"Nepton CR-61" referred to herein as "CR-61" is a cation exchange membrane. This membrane is of a sulfonated polystyrene type, reinforced with a Dynel fabric. The CR-61 membranes are approximately 0.7 mm. thick.

The Beckman Zeromatic No. 9600 potentiometer was used herein to measure electrode potentials.

EXAMPLE I

A Fiberfrax sheet of approximately 1/8" thickness and 66 mm. diameter was painted with an ink-like suspension prepared by mixing 0.250 g. of Pt black with 5 cm.$^3$ of 1 N sulfuric acid. This entire fluid suspension was applied with a paint brush to the concentric inner area of 56 mm. diameter of the Fiberfrax paper. The fibrous pad absorbed the sulfuric acid completely while the catalyst powder remained at the surface at which it had been applied. Five cm.$^3$ of sulfuric acid were just sufficient to moisten the entire pad. An 80 mesh screen of 56 mm. diameter which was woven of platinum 10 percent rhodium wire of 0.0035" diameter was placed on top of the catalyst surface to insure good electrical contact with the catalyst. The screen itself was without appreciable catalytic effect for oxygen at room temperature. A flat contact ring of gold with an inner diameter of 50 mm. was placed over the wire screen.

This Fiberfrax assembly was used as an oxygen electrode (cathode) in a hydrogen-oxygen fuel cell. The utilized active area of this electrode was 19.6 cm.$^2$, exposing about 80 percent of the external surface of the powder to the gas.

Other oxygen electrodes were prepared on Fiberfrax sheets by painting onto the Fiberfrax suspensions of various materials, each in 5 cm.$^3$ of 1 N sulfuric acid. In one case 0.250 g. of Pd black was used.

An extensive series of metal on carbon catalysts was prepared. In each case 0.250 g. of the catalyst including the carrier was suspended in 5 cm.$^3$ of 1 N sulfuric acid and subsequently deposited on the Fiberfrax with retention of the sulfuric acid electrolyte by absorption in the Fiberfrax sheets.

Similarly, a hydrogen electrode (anode) was prepared for use with the aforesaid cathodes in a hydrogen-oxygen fuel cell. This was prepared by painting on Fiberfrax a suspension of 5 cm.$^3$ of 1 N sulfuric acid containing 0.250 g. of either 10 percent Pt on carbon or 10 percent Pd on carbon.

EXAMPLE II

A cell was constructed corresponding to that shown in FIGS. 1 and 2, using electrodes prepared according to Example I.

The cell was made of Lucite. All parts in contact with acid consisted of acid resistant materials such as gold or Fiberfrax. The section of the cell assembly containing the electrodes, catalyst and electrolyte is shown in greater detail in FIG. 2. The anodic and cathodic compartments were separated by a sheet of cation exchange membrance CR-61, 0.7 mm. thick, which had been equilibrated with 5 percent sulfuric acid. The function of the ion exchange membrane was not to serve as electrolyte but to provide a gas tight separation between anode and cathode compartment. Ajacent to both sides of the cation exchange membrane was a layer of the Fiberfrax paper, which was soaked with the electrolyte. The surface opposite the membrane was coated with a uniform coating of catalyst. By using two Fiberfrax to absorb the electrolyte, it was ensured that the electrode processes occurred at the pH of of the electrolyte (pH of 5 percent sulfuric acid was 0.4). Electrical contact was provided for measurements by means of a spacer ring of nonporous graphite which was placed between the gold ring of the electrode assembly and a terminal gold ring embedded into the Lucite screw plug at each side of the cell.

The cell was operated at room temperature with pure oxygen and hydrogen passing at a slow rate through their respective compartments at a pressure of 100 mm. water. Electrode potentials were measured with a Beckman Zeromatic No. 9600 instrument. By extending the membrane into a beaker with saturated potassium chloride solution, as shown in FIGURE 4 of the drawings, it was possible to make measurements of cathode and anode potentials by means of a saturated calomel electrode.

EXAMPLE III

A cell was constructed as described in Example II, but using electrodes prepared as follows:

A suspension was made of 0.250 g. of platinum black in an excess of 1 N $H_2SO_4$. This suspension was applied to a chamois leather of 56 mm. diameter by filtering in a Buchner-type filter. The chamois was of a commercial cleaning type which is not of uniform thickness. It was approximately 1 mm. thick.

The chamois was placed in the flat bottom filter and the suspension of catalyst in acid was poured on the chamois using a light vacuum in order to deposit a layer of catalyst on the surface of the cloth while drawing off the electrolyte in excess of that which was necessary to retain a moistened chamois. The electrode was assembled as in Example I and inserted in a cell as a cathode.

An anode was prepared as in Example I with 10 percent Pt on carbon powder, but the suspension was deposited on the Fiberfrax sheet by the filtering method described above.

This cell had an open circuit voltage of about .920 volt. At a current density of 13 ma./cm.$^2$ the cathode potential referred to a standard hydrogen electrode was about .583 volt.

The desirability of evaluating the catalytic electrodes of this invention with acid electrolytes has been discussed. The following Example IV using electrodes prepared in accordance with this invention gives a comparison of fuel cell operation with various electrolytes.

EXAMPLE IV

Various acid or nearly neutral electrolytes were evaluated using catalysts in accordance with this invention, which had previously been shown to have favorable activity as oxygen and hydrogen electrodes.

Figure 5:
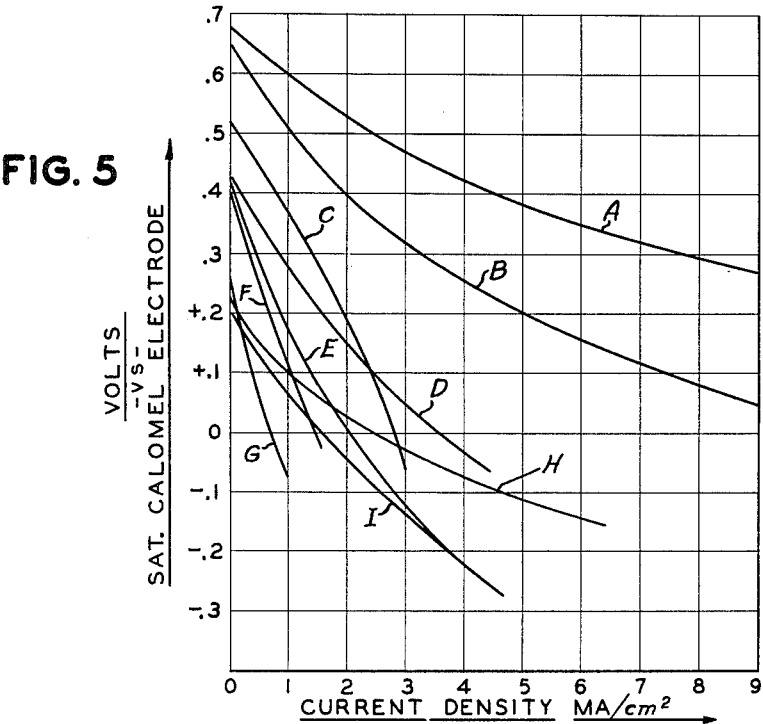

The results are shown in Table I and FIGURE 5. The electrolytes tested in this example ranged in initial pH's from 0.5 to 7.4.

In FIGURE 5, the electrolyte of curve A had a pH of 0.5 and contained 0.5 M $H_2SO_4$, the electrolyte of curve B had a pH of 6 and contained 0.4 M $K_2SO_4$, the electrolyte of curve C had a pH of 2.6 and contained 0.5 M $Al_2(SO_4)_3$, the electrolyte of curve D had a pH of 3.6 and contained 0.66 M citric acid and 0.33 M potassium citrate, the electrolyte of curve E had a pH of 4.6 and contained 1.0 N acetic acid and 1.0 M sodium acetate, and the electrolyte of curve F had a pH of 4.0 and contained 0.5 M KH phthalate. The electrolyte of curve G had a pH of 4.2 and contained 0.4 M $K_2SO_4$ plus a trace of $H_2SO_4$, the electrolyte of curve H had a pH of 4.1 and contained 1.0 M $NH_4Cl$, and the electrolyte of curve I had a pH of 7.4 and contained 1 M $NaHCO_3$.

Table I

CATHODIC PERFORMANCE OF PLATINUM METAL CATALYSTS AT VARIOUS pH VALUES TESTED IN FUEL CELL

| No. | Electrolyte | Specific resistance (ohm×cm.) | Initial pH | Approximate final pH | | Initial cell voltage | Open circuit potentials, volts | |
|---|---|---|---|---|---|---|---|---|
| | | | | Anolyte | Catholyte | | Final cell voltage | Initial cathode potential vs. sat. calomel |
| 1 | 0.5 M $Al_2(SO_4)_3$ | 29 | 2.6 | 2.4 | 3.8 | .84 | .765 | .515 |
| 2 | 0.6 M citric acid, 0.33 M K-citrate. | 24 | 3.6 | 3.6 | 3.6 | .85 | .74 | .425 |
| 3 | 0.5 M K-biphthalate | 30 | 4.0 | 4.0 | 4.0 | .84 | .835 | .425 |
| 4 | 1 M $NH_4Cl$ | 8.5 | 4.1 | 2–3 | 7–8 | .51 | .12 | .235 |
| 5 | 0.4 M $K_2SO_4$ acidified with $H_2SO_4$. | 15 | 4.2 | (¹) | (¹) | .585 | .39 | .25 |
| 6 | 1 M acetic acid, 1 M Na acetate | 22 | 4.6 | 4.6 | 4.6 | .93 | .87 | .410 |
| 7 | 0.4 M $K_2SO_4$ | 15 | 6.0 | (¹) | (¹) | .98 | .975 | .65 |
| 8 | 1 M $NaHCO_3$ | 19 | 7.4 | 7.4 | 7.4 | .915 | .87 | .200 |
| 9 | 0.5 M $H_2SO_4$ | 4.7 | 0.5 | (¹) | (¹) | .965 | .935 | .750 |

| No. | Electrolyte | Open circuit potentials, volts | | Total amp. hours | Ml water produced | Catalyst percent metal on carbon | | Type of membrane |
|---|---|---|---|---|---|---|---|---|
| | | Deviation from equilibrium potential | Final cathode potential vs. sat. calomel | | | Anode | Cathode | |
| 1 | 0.5 M $Al_2(SO_4)_3$ | .315 | .440 | .027 | .009 | 10 Pd | 2.5 Pd+2.5 Pt | Cation exchange. |
| 2 | 0.6 M citric acid, 0.33 M K-citrate. | .35 | .370 | .038 | .012 | 10 Pd | 10 Pt | Do. |
| 3 | 0.5 M K-biphthalate | .33 | .425 | .017 | .005 | 10 Pt | 10 Pt | Do. |
| 4 | 1 M $NH_4Cl$ | .51 | .085 | .035 | .010 | 10 Pd | 10 Pt | Do. |
| 5 | 0.4 M $K_2SO_4$ acidified with $H_2SO_4$. | .49 | .05 | .003 | .001 | 10 Pd | 10 Pt | Do. |
| 6 | 1 M acetic acid, 1 M Na acetate | .31 | .34 | .037 | .012 | 10 Pd | 10 Pt | Unspecific Nalfilm. |
| 7 | 0.4 M $K_2SO_4$ | (−.01) | .61 | .065 | .022 | 10 Pt | 10 Pt | Anion exchange. |
| 8 | 1 M $NaHCO_3$ | .35 | .135 | .037 | .012 | 10 Pd | 10 Pt | Cation exchange. |
| 9 | 0.5 M $H_2SO_4$ | .21 | .725 | .100 | .034 | 10 Pt | 10 Pt | Do. |

¹ Not determined.

In accordance with FIGURE 5 only 0.4 M $K_2SO_4$ of the less acid electrolytes gives as favorable oxygen electrode performance as the 0.5 M $H_2SO_4$. The voltage at a given current density in fact is similar for 0.5 M $H_2SO_4$ and 0.4 M $K_2SO_4$, with no advantage for the $H_2SO_4$ (except perhaps at high current densities). In interpreting the curves of FIGURE 5 it is understood that the cathode potential is shifted about 0.059 volt in the negative direction for each pH unit increase. Thus, for a comparison of voltage available with the 0.5 M $H_2SO_4$ and 0.4 M $K_2SO_4$ electrolytes, 0.325 volt should be added to the indicated cathode voltage for the 0.4 M $K_2SO_4$ at all current densities.

As catalyst for the cathode 10 percent platinum on carbon was generally employed; however, in the experiment with 0.5 M aluminum sulfate as electrolyte the cathode was a mixed catalyst: 2.5 percent palladium 2.5 percent platinum. As anode catalyst either 10 percent platinum or 10 percent palladium on carbon was used.

In measuring polarization curves periods of exactly ten minutes of load were used, each load period being followed by a ten minute period of open circuit in order to allow the electrode to return to its initial state. If full recovery of the open circuit potential was not obtained at or before the end of an idle period, the electrode had obviously deteriorated in the preceding load period, presumably due to overload. All measurements referred to in the following were taken at the end of a ten minute period.

The gas flow rate through each electrode compartment was kept constant at 40 cm.$^3$/minute. It has been observed that the electrode potentials were somewhat variable at low flow rates. The rate of 40 cm.$^3$/minute selected was in the range in which the potentials had been found to be independent of flow rate. The gases were passed through 1 N sulfuric acid, the electrolyte used for much of our test work, to maintain constancy of the water vapor pressure of the gases in the electrode compartments of the test cells.

In general, acceptable open circuit potentials were found except for 1 M ammonium chloride and 0.4 M potassium sulfate acidified with a drop of sulfuric acid (Nos. 4 and 5, Table I) as electrolytes. The deviations from the equilibrium potentials were in general of the order of .3 to .35 volts which is only slightly poorer than with 1 N sulfuric acid as electrolyte. An exceptionally high open circuit potential was exhibited in 0.4 M potassium sulfate solution. A pH of 6 has been measured for this solution; even if the pH value had been 5 only, the deviation of the open circuit potential of .65 volt vs. the saturated calomel electrode from the equilibrium value would have been .05 volt only. The cell voltage with this electrolyte was .98 volt.

Under current load the electrodes became strongly polarized in the electrolytes tested as shown in FIGURE 5. Resistance polarization cannot have been the major cause of the polarization since 0.4 M potassium sulfate solution having a specific resistance of the same magnitude as the other electrolytes gave a considerably better current voltage curve. We have also tested an electrolyte consisting of 1 N sulfuric acid and 0.2 M potassium sulfate without, however, obtaining a better result than with 0.4 M potassium sulfate alone.

With 0.4 M potassium sulfate electrolyte the cell voltage was fully recovered after current load (No. 7, Table I). Fair voltage recoveries were also shown with 0.5 M potassium biphthalate, 1 M acetic acid, and 1 M sodium acetate, and with 1 M sodium bicarbonate (Nos. 3, 6, 8, Table I).

Although the power was drawn in these test corresponding to the production of only from 0.005 to .02 ml. of water, definite changes in the pH of catholyte and anolyte were observed in some instances. These changes were determined with pH paper and, therefore, are approximate in nature. The pH changes found may be ascribed to insufficient ionic transport through the ion exchange membranes.

It appears that, except for the 0.4 M $K_2SO_4$, none of these less acid electrolytes shown in Table I give as favorable fuel cell performance as 0.5M (1 N) $H_2SO_4$. For general fuel cell application with acid electrolyte strong acids such as sulfuric acid or phosphoric acid appear to be suitable. We have measured the performance of 10 percent platinum on carbon at various sulfuric acid concentrations with the following result:

*Table II*

| Normality of sulfuric acid | Cathode potential vs. standard hydrogen electrode | | |
|---|---|---|---|
| | Open circuit | 1 ma./cm.$^2$ | 10 ma./cm.$^2$ |
| 0.5 | 1.01 | .90 | .40 |
| 1 | 1.00 | .88 | .49 |
| 2 | .98 | .87 | .54 |
| 3 | .98 | .89 | .635 |

At higher current densities, in excess of 5 ma./cm.$^2$, the dependence on acid concentration became evident. It seems, therefore, indicated to operate fuel cells of our test design with 3 N sulfuric acid or possibly with even stronger concentrations. The solubility of $K_2SO_4$ is limited to about 0.6 M at ambient temperatures, and up to this concentration it has been shown to be a favorable electrolyte. It is indicated by the showing of this invention that more soluble salts of strong acids and strong bases with anions stable under electrolytic conditions are likely to be favorable for high current density operation.

EXAMPLE V

One problem in using strong acid electrolytes is possible attack on the catalytically active metals used in the electrodes. Base metals either as catalysts or porous supports are usually eliminated from consideration for strong acid electrolyte operation because of attack by the acid.

Same precious metals also are not entirely resistant to attack by even moderately concentrated sulfuric acid such as used in the present measurements. This is especially true when precious metal is deposited in finely divided form on carbon carriers to serve as catalytic electrode. Such solubility could be particularly detrimental for the shelf life of the fuel cell. When the catalyst is continuously in contact with acid even a slow attack might cause serious harm. We have, therefore, studied the attack of representative electrode catalysts by sulfuric acid.

There are at least two types of changes which can occur with even a slight solubility of the catalyst metal:

(1) Solution of the metal in acid either during storage of the fuel cell or during load; in the latter case a metal could be dissolved anodically and be deposited on the cathode.

(2) Dissolving with subsequent reprecipitation. This could happen when the metal in extremely finely divided form exhibits a certain solubility but is less soluble in a more compact form. In this case the smallest metal particles would dissolve and reprecipitate with growth of the larger crystallites. Since catalytic activity is a function of metal dispersion it would be expected that this phenomenon would be detrimental for the electrode performance.

Qualitative results were obtained as follows:

(1) *Platinum.*—Platinum black was treated for 24 hours with 1 N sulfuric acid. A trace of platinum was found in the solution with no increase in the crystallite size of the platinum metal. The sample was then washed thoroughly with deionized water and again treated 24 hours in 1 N sulfuric acid. Again, a trace of platinum was found in the solution.

(2) *Palladium.*—Palladium black was treated in the same way. A considerable amount of palladium went into solution. Also, an indication of an increase in crystallite size of the palladium metal was observed employing X-ray diffraction methods. Palladium black was also reduced at 100° C. in hydrogen and then treated 24 hours in 1 N sulfuric acid. Again, a considerable amount of dissolved palladium was observed, possibly somewhat less than before, because of some sintering at 100° C.

(3) *Ruthenium.*—A 5 percent ruthenium on carbon powder catalyst was treated for 24 hours in 1 N sulfuric acid. An indication of an increase in the crystallite size of metallic ruthenium was found.

It can be concluded from the experiments described that palladium is not suitable as an electrode catalyst in acid media because of its relatively high rate of corrosion. This finding, together with the measurements of the preceding section, confirm that platinum may be the best material for electrode catalysts under these conditions.

EXAMPLE VI

A comparative study was made as to fuel cell performance of a variety of oxygen electrode catalysts, using 1 N $H_2SO_4$ as electrolyte and 10 percent Pt on carbon powder as hydrogen electrode catalyst. In each case the cathode consisted of one or more relatively acid-resistant metals deposited on carbon powder. The overall resistance of the assembled cell was between 0.5 and 0.6 ohms. The electrodes were constructed as previously described in Example I, the fuel cells were assembled in accordance with Example II, and the fuel cells were operated as discussed in Example IV.

The following metals and combinations of metals were investigated:

*Table III*

| | Percent metal on carbon | | | | | |
|---|---|---|---|---|---|---|
| | Pt | Pd | Ru | Ir | Os | Au |
| Group I | 5 | | | | | |
| | 10 | | | | | |
| | | 10 | | | | |
| | | | 10 | | | |
| | | | | 5 | | |
| | | | | | 5 | |
| | | | | | | 5 |
| Group II | 9.5 | | 0.5 | | | |
| | 7.5 | | 2.5 | | | |
| | 5.0 | | 5.0 | | | |
| | 2.5 | | 7.5 | | | |
| Group III | | 9.5 | 0.5 | | | |
| | | 7.5 | 2.5 | | | |
| | | 5.0 | 5.0 | | | |
| | | 2.5 | 7.5 | | | |
| Group IV | | 7.5 | | | | 2.5 |
| | | 5.0 | | | | 5.0 |
| | | 2.5 | | | | 7.5 |
| Group V | 4.5 | 4.5 | 1.0 | | | |
| | 7.0 | 2.0 | 1.0 | | | |
| | 2.0 | 7.0 | 1.0 | | | |
| | 3.3 | 3.3 | 3.3 | | | |

Figure 6:
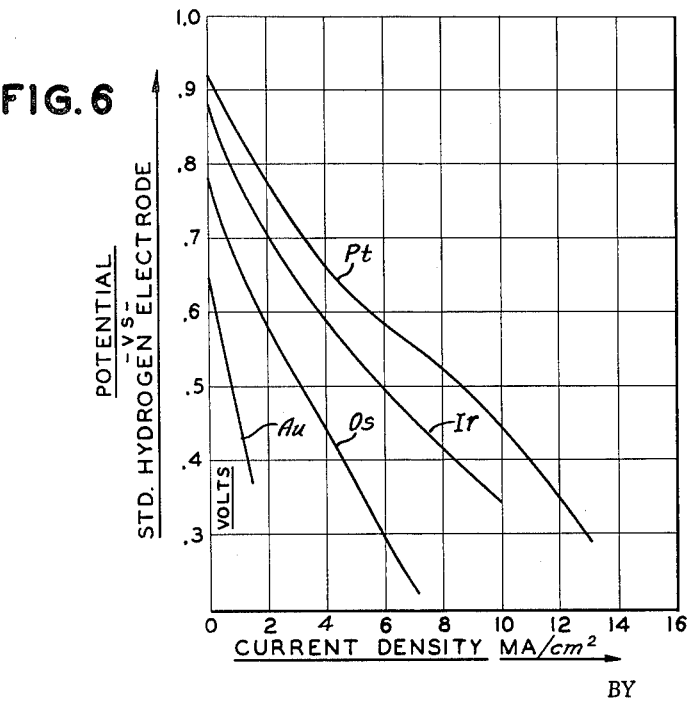
Figure 7:
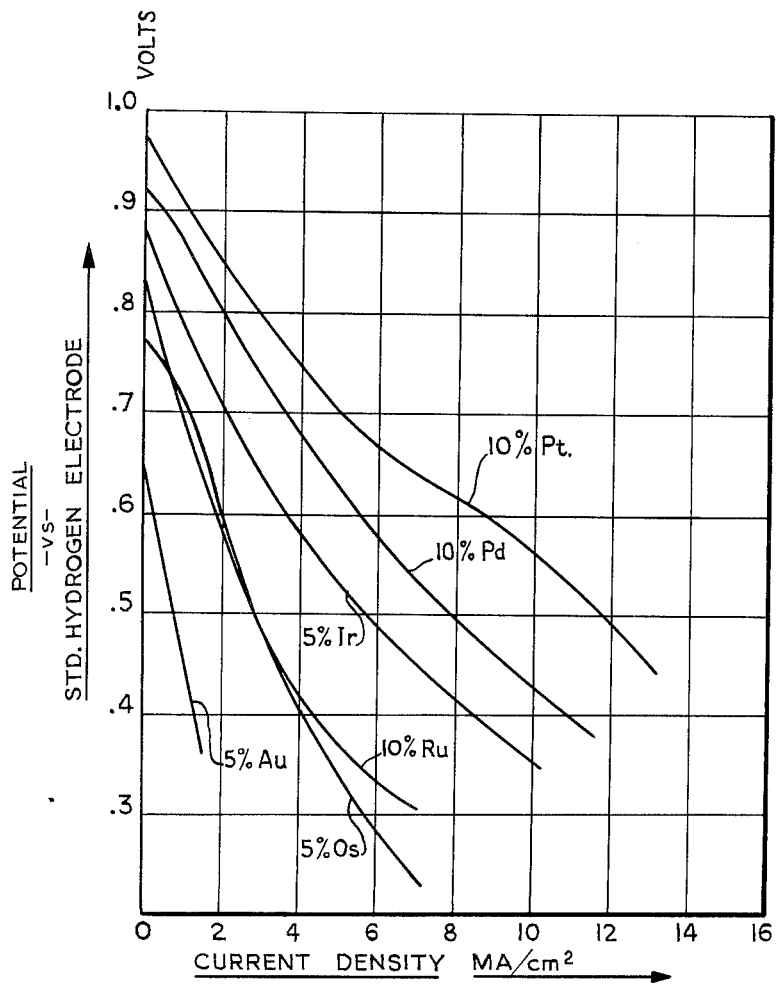

The data obtained with the single metals of Table III, Group I are shown in FIGS. 6 and 7. Evidently platinum is the most effective catalyst, followed by palladium. Comparison of the polarization curve of 10 percent palladium on carbon with that of 5 percent iridium on carbon indicates that these two metals might be equivalent, the difference possibly only due to the difference in metal concentration. The curves for 5 percent and 10 percent platinum of FIGS. 6 and 7 show a pronounced influence of the metal concentration which is further discussed in the subsequent section. Hence, it may be concluded that 10 percent iridium might yield similar polarization curves to 10 percent palladium. Gold and osmium are definitely inferior. The performance of ruthenium is disappointing. With ruthenium the open circuit potentials were sluggishly established and somewhat higher values might have resulted in open circuit periods longer than ten minutes. Nevertheless, the expectations for a superior activity of ruthenium based on its catalytic effect on hydrogen peroxide decomposition have not been borne out.

Figure 8:
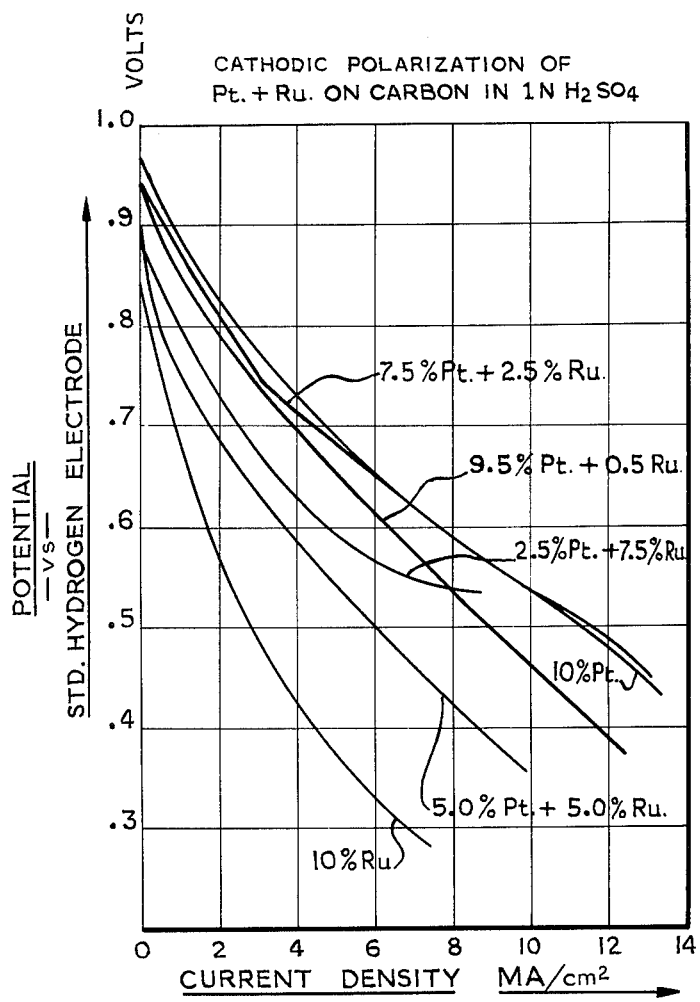
Figure 9:
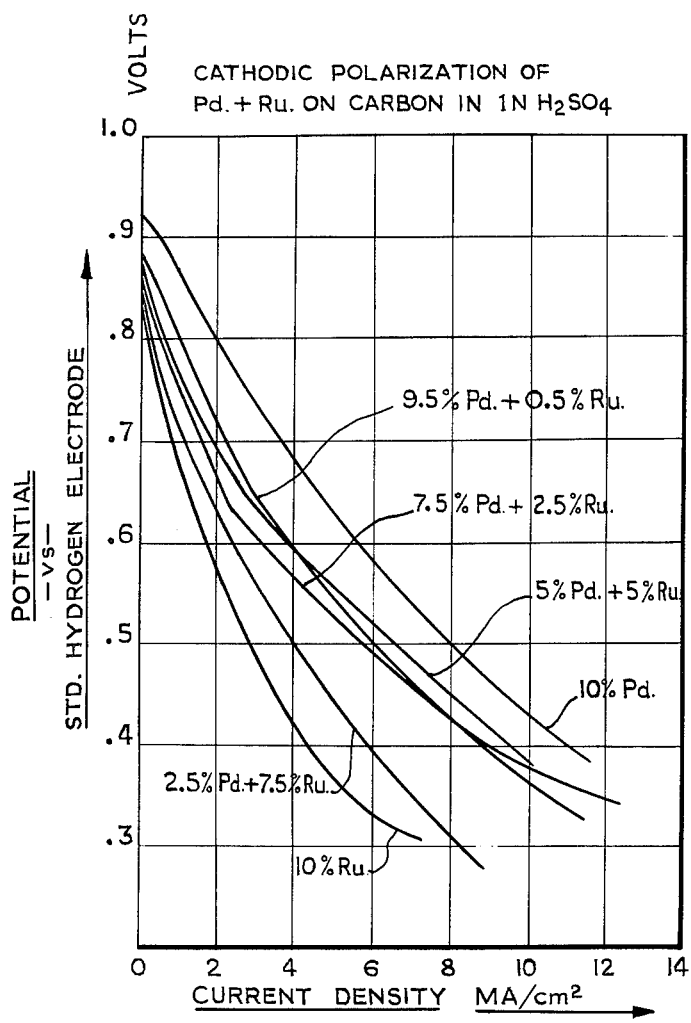
Figure 10:
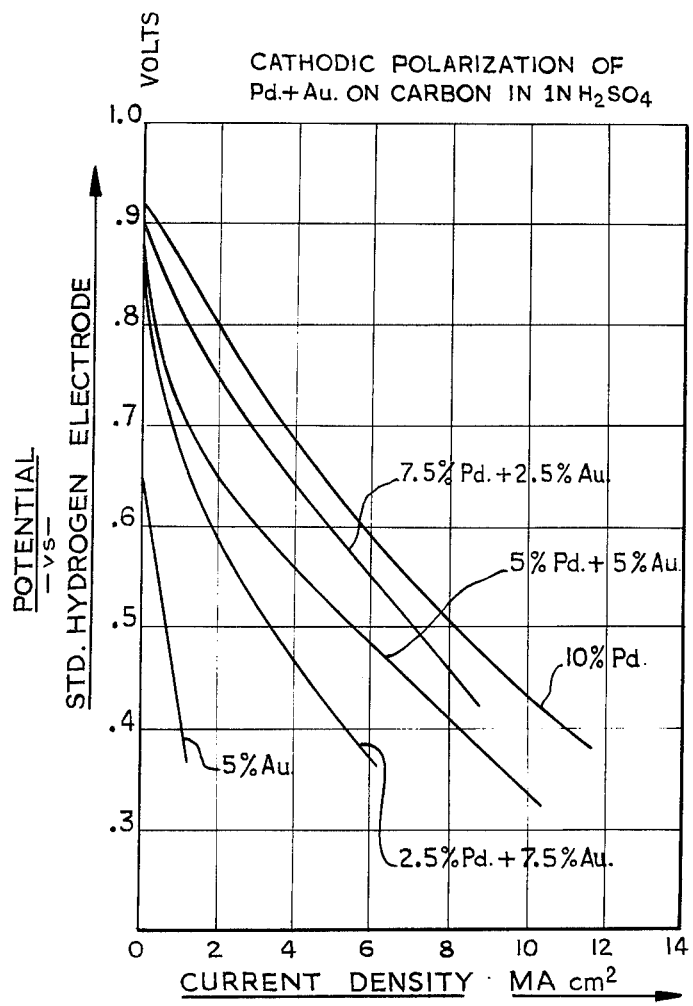

The test results obtained with the binary metal combinations of Groups II, III and IV of Table III as catalyst at the oxygen electrode are shown in respectively FIGURES 8, 9 and 10 of the accompanying drawings. FIGURE 8 also shows the test results obtained with separately 10% Ru and 10% Pt as such catalyst; FIGURE 9 also shows the test results obtained with separately 10% Ru and 10% Pd as such catalyst; and FIGURE 10 also shows the test results obtained with separately 5% Au and 10% Pd as such catalyst. In no case was the activity of the more active component exceeded by that of a combination. In general the potentials varied in proportion to the contents of less active and more active component. Thus no promoter additive has been discovered.

Figure 11:
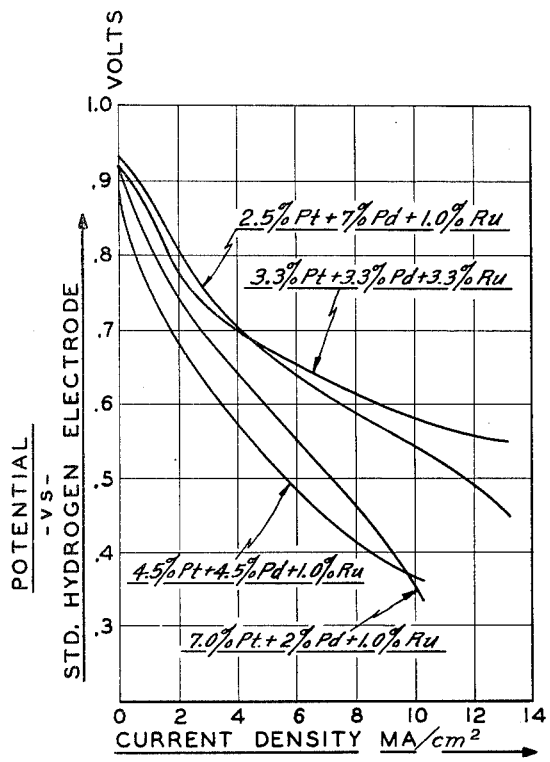

Among the ternary compositions of Group V of Table III, the test results obtained with such ternary compositions being set forth in FIGURE 11, the composite consisting of 3.3 percent platinum, 3.3 percent palladium, 3.3 percent ruthenium is a better cathode catalyst than any of the other combinations. At current densities above 10 ma./cm.$^2$ this particular composite yielded even higher oxygen potentials than 10 percent platinum alone. However, the potentials with the ruthenium-containing catalysts were established only slowly and further testing gave poorer results.

EXAMPLE VII

The importance for practical fuel cells of operation at high current densities and the higher current densities possible with increased sulfuric acid concentration have been discussed. To examine concentrated electrolytes further, Pt black and 30 percent Pt on carbon catalyst with 5 N KOH, and Pt black 30 percent Pt on carbon and 10 percent Pt on carbon with 3 N $H_2SO_4$, were compared.

An improved method for positioning the catalysts in these experiments resulted in higher and more reproducible current densities than in the previous examples. After the Pt 10 percent Rh screen was contacted with the catalyst as described in Example I, a non-porous graphite disk about ¼" thick and with three or more ½" holes was placed against each screen. When these disks were used the gold contact rings were frequently omitted. It was found that by suitable adjustment of pressure on the graphite disks superior and reproducible current deliveries could be obtained.

The attached FIGURE 12 gives a comparison of current deliveries under these conditions for the catalysts specified. In each case measurements were made by the alternate 10 minutes open circuit and 10 minutes operating procedure described in Example IV. The open circuit voltage of FIGURE 12 and the operating voltages are in each case the results after 10 minutes stabilization under the condition.

With these concentrated electrolytes the Pt black catalysts are relatively less inferior to the carrier based catalysts than in the cases of less concentrated electrolytes. It is seen from the figure that results using the 5 N KOH may be slightly superior for Pt black to 30 percent Pt on carbon on a weight of catalyst basis; however, on a contained Pt basis the latter is much better. With the 3 N $H_2SO_4$ electrolyte the 10 percent Pt on carbon delivers slightly more current, and the 30 percent Pt on carbon slightly less current, than Pt black on a weight of catalyst basis; differences between current deliveries with these three catalysts may not be significant. On a contained Pt basis the 30 percent Pt on carbon catalyst, and particularly the 10 percent Pt on carbon catalyst, is much superior to Pt black.

A fuel cell was assembled without the ion exchange membrane which in the previous examples served as a gas-tight separation between the anode and cathode compartments. According to this procedure 0.250 gram of 10 percent Pt on carbon suspended in 5 cc. of 1 N $H_2SO_4$ was painted on two 66 mm. diameter disks of Fiberfrax by the method described in Example I, in which after the catalyst is adsorbed on Fiberfrax' surface the Fiberfrax remains moistened with the 1 N $H_2SO_4$. A sandwich was made of three additional disks of Fiberfrax (also moistened with 1 N $H_2SO_4$) between the two pieces coated with catalyst, the catalyst-coated surface in each case being positioned exteriorally in the sandwich. Thus one moistened catalyst was directly exposed to the fuel and the other to the oxidizer.

Two stainless steel pieces with cupped sections slightly smaller than the catalyst disks were pressed with their cupped sides respectively against the catalyst-coated layers of the sandwich, so that the edges of the stainless steel pieces contacted the outer rims of the catalyst disks and the cupped chambers were positioned next to the remainder of each catalyst. One cupped chamber had inlet and outlet openings for conducting $H_2$ fuel over the one catalyst surface, and the other cupped chamber had inlet and outlet openings for conducting $O_2$ oxidizer to the other catalyst surface. Current was taken from the cell by contacts to the two stainless steel pieces.

A calomel electrode was positioned in contact with the middle layers of Fiberfrax and E.M.F.'s to the anodic and cathodic stainless pieces read at successive intervals. An open circuit cell E.M.F. of .875 volt was measured. After operation at 1 ohm added resistance to the cell and 1.77 milliamperes current, the cell voltage was read as .115 volt.

This voltage under load is seen to be operative but relatively inferior. The inferior results of this example to those previously disclosed are attributed to: (1) lack of a gas-impermeable membrane between the electrodes permitting some gas to pass through the electrolyte, and (2) probably poor electrical contact between the central parts of the catalyst coatings and the cathodic and anodic stainless steel pieces.

It will be obvious to those skilled in the art that many modifications may be made within the scope of the present invention without departing from the spirit thereof, and the invention includes all such modifications.

What is claimed is:

1. An electricity-producing apparatus comprising a container, unobstructed anode and cathode compartments provided within said container, a gas-impervious ion exchange membrane disposed within the container in such fashion as to provide a gas-impervious separation between the anode and cathode compartments, a substantially electrically non-conductive porous member disposed in the anode compartment on one side of the ion exchange membrane, another substantially electrically non-conductive porous member disposed in the cathode compartment on the opposite side of the gas-impervious membrane, the non-conductive porous members being of a material from the group consisting of ceramic, cellulose and animal skins, the surface of each such non-conductive porous member farthest removed from the ion exchange membrane having deposited thereon a substantially uniform thin coating of powdered activated carbon-supported precious metal-containing catalyst particles, an electrolyte initially wetting said gas-impervious ion exchange membrane and such porous members and catalyst particles, the porous members subsequently absorbing electrolyte from the supported catalyst particles, first electrically conductive means to provide electrical contact with the catalyst coating on the anode compartment porous member, second electrically conductive means to provide electrical contact with the catalyst coating on the cathode compartment porous member, means for supplying a fuel into the anode compartment into contact with the catalyst on the porous member therein, and means for supplying an oxidizer into the cathode compartment into contact with the catalyst on the porous member therein.

2. The apparatus of claim 1 wherein the substantially non-conductive porous members are of a ceramic.

3. The apparatus of claim 1 wherein the substantially non-conductive porous members are of cellulose.

4. The apparatus of claim 1 wherein the substantially non-conductive porous members are of an animal skin.

5. The apparatus of claim 1 wherein the catalyst is a platinum group metal-containing catalyst.

6. The apparatus of claim 1 wherein the electrolyte is an acid electrolyte.

References Cited by the Examiner
UNITED STATES PATENTS

| | | | |
|---|---|---|---|
| 409,366 | 8/1889 | Mond et al. | 136—86 |
| 885,054 | 4/1908 | Junger | 136—86 |
| 2,798,110 | 7/1957 | Peters | 136—28 |
| 2,914,596 | 11/1959 | Gorin et al. | 136—86 |
| 2,980,749 | 4/1961 | Broers | 136—120 X |
| 3,013,098 | 12/1961 | Hunger et al. | 136—86 |
| 3,057,943 | 10/1962 | Strauss | 136—6 |
| 3,097,974 | 7/1963 | McEvoy et al. | 136—120 |
| 3,134,697 | 5/1964 | Niedrach | 136—86 |

WINSTON A. DOUGLAS, *Primary Examiner.*

JOHN R. SPECK, JOHN H. MACK, *Examiners.*